(12) United States Patent
Dugue et al.

(10) Patent No.: US 9,484,787 B2
(45) Date of Patent: *Nov. 1, 2016

(54) VOLTAGE REGULATOR DEVICE FOR ROTARY ELECTRIC MACHINE, BEARING FOR ROTARY ELECTRIC MACHINE AND ROTARY ELECTRIC MACHINE COMPRISING SUCH BEARING

(75) Inventors: Christophe Dugue, Palaiseau (FR); Brice Lecole, Paris (FR); Benoit Walme, Feucherolles (FR)

(73) Assignee: Valeo Equipments Electriques Moteur (FR)

( * ) Notice: Subject to any disclaimer, the term of this patent is extended or adjusted under 35 U.S.C. 154(b) by 407 days.

This patent is subject to a terminal disclaimer.

(21) Appl. No.: 13/994,629

(22) PCT Filed: Dec. 19, 2011

(86) PCT No.: PCT/FR2011/053045
§ 371 (c)(1),
(2), (4) Date: Aug. 30, 2013

(87) PCT Pub. No.: WO2012/085423
PCT Pub. Date: Jun. 28, 2012

(65) Prior Publication Data
US 2013/0334914 A1  Dec. 19, 2013

(30) Foreign Application Priority Data

Dec. 20, 2010 (FR) .................................. 10 60780

(51) Int. Cl.
*H02K 9/02* (2006.01)
*H02K 1/32* (2006.01)
(Continued)

(52) U.S. Cl.
CPC *H02K 9/02* (2013.01); *H02K 5/20* (2013.01); *H02K 9/06* (2013.01); *H02K 9/28* (2013.01); *H02K 11/048* (2013.01)

(58) Field of Classification Search
CPC ............ H02K 9/02; H02K 9/06; H02K 5/20; H02K 11/048; H02K 9/28
USPC ..... 310/64, 58, 71, 239, 68 R, 68 D, 65, 52, 310/91, 67 R
See application file for complete search history.

(56) References Cited

U.S. PATENT DOCUMENTS 5,345,132 A * 9/1994 Sasaki .................... H02K 5/141
310/232
5,907,203 A  5/1999 Chen et al.
(Continued)

FOREIGN PATENT DOCUMENTS

EP  0 454 039  10/1991
EP  1 326 321  7/2003
(Continued)

*Primary Examiner* — Terrance Kenerly
*Assistant Examiner* — Ahmed Elnakib
(74) *Attorney, Agent, or Firm* — Berenato & White, LLC

(57) ABSTRACT

A voltage regulator device provided in a bearing of a rotary electric machine of a motor vehicle. The regulator device comprises a support and at least one electronic component configured to participate in the control of the electric machine. The support comprises a first part on which the at least one electronic component is mounted. The first part having an edge equipped with a brush holder provided with at least one brush-holder receptacle configured to accommodate a brush for making an electrical connection with a rotor of the electric machine. The device is configured to allow air to flow through the first part of the support, in contact with the brush holder. The device includes at least one air circulation slot provided through the support between the first part and the brush-holder. The support covers an air opening in the bearing.

13 Claims, 5 Drawing Sheets

(51) Int. Cl.
*H02K 11/04* (2016.01)
*H02K 5/20* (2006.01)
*H02K 9/06* (2006.01)
*H02K 9/28* (2006.01)

(56) References Cited

U.S. PATENT DOCUMENTS

| | | |
|---|---|---|
| 6,625,868 B2 * | 9/2003 | Rahbar et al. .................. 29/596 |
| 6,989,617 B1 * | 1/2006 | Vandenbossche ..... H02K 19/36 310/227 |
| 7,019,424 B2 | 3/2006 | Aeschilmann et al. |
| 2002/0175589 A1 | 11/2002 | Takizawa et al. |
| 2003/0127920 A1 * | 7/2003 | Yamazaki ............ H02K 11/046 310/58 |
| 2007/0035188 A1 * | 2/2007 | Miller .................... H02K 5/141 310/64 |
| 2008/0191588 A1 * | 8/2008 | Dubuc ................. H02K 11/048 310/68 D |

FOREIGN PATENT DOCUMENTS

| | | |
|---|---|---|
| FR | 2 649 797 | 1/1991 |
| FR | 2 710 200 | 3/1995 |
| FR | 2 744 575 | 8/1997 |
| FR | 2 745 444 | 8/1997 |
| FR | 2 754 650 | 4/1998 |
| FR | 2 807 583 | 10/2001 |
| FR | 2 857 517 | 1/2005 |
| WO | WO 02/054566 | 7/2002 |
| WO | WO 02/093717 | 11/2002 |

* cited by examiner

VOLTAGE REGULATOR DEVICE FOR ROTARY ELECTRIC MACHINE, BEARING FOR ROTARY ELECTRIC MACHINE AND ROTARY ELECTRIC MACHINE COMPRISING SUCH BEARING

CROSS-REFERENCE TO RELATED APPLICATIONS AND CLAIM TO PRIORITY

This application is a national stage application of International Application No. PCT/FR2011/053042 filed Dec. 19, 2011, which claims priority to French Patent Application No. 10/60779 filed Dec. 20, 2010, of which the disclosures are incorporated herein by reference and to which priority is claimed.

FIELD OF THE INVENTION

The present invention relates to a voltage regulator device for a rotary electrical machine, which in particular is polyphase, such as an alternator and/or an alternator-starter of a motor vehicle.

The present invention also relates to a bearing of a rotary electrical machine of this type equipped with a voltage regulator device of this type and a current rectification device.

Finally, the present invention relates to a rotary electrical machine of this type equipped with a bearing of this type.

PRIOR ART

Motor vehicle alternators are known at present which comprise a wound stator surrounding a rotor and at least one excitation winding of the rotor. They function as an electricity generator to supply an on-board network of the vehicle and to recharge its battery. For this purpose, the rotor of the alternator is driven by the thermal engine of the vehicle via a device for transmission of movement, and its excitation winding is supplied by an electric current, known as the excitation current. The rotor, thus magnetised, generates an electromotive force, such that an alternating electric current is induced in the stator winding of the machine, configured to be connected to the on-board network and to the battery by means of at least one bridge for rectification of alternating current into direct current.

It is necessary to regulate the voltage supplied to the on-board network and to the vehicle battery so that the receivers of the on-board network and the battery are not damaged, and work correctly and reliably. For this purpose, the excitation current of the excitation winding is controlled.

For this purpose, voltage regulator devices are known which are designed to control the excitation current by means of an electronic circuit, comprising one or a plurality of electronic components which are on board at the level of the alternator. These circuits comprise brush-holders which are provided with at least one receptacle for receipt of a brush which makes it possible to establish an electrical connection with the rotor of the electrical machine for its supply with excitation current.

In document US 2007/0035188, the regulator comprises a housing comprising a first portion which includes the brush-holder, a second portion which includes the electronic component(s), and a third portion which includes a connector. The first portion is provided with two holes for the securing of the regulator by means of bolts. The same applies to the third portion. The four holes for securing of the regulator are thus blocked by bolts.

It has been found that the functioning of the known devices was no longer satisfactory when the temperature conditions became particularly severe, for example higher than 120°, with the increase in power in the electrical machines and the requirements for compactness making it necessary to position the voltage regulator device and the alternator as close as possible to the thermal engine of the motor vehicle. In particular it has been found that the functioning of the brush-holders could be adversely affected.

SUBJECT OF THE INVENTION

The object of the invention is to resolve the preceding problems, and the invention relates to a voltage regulator device for a rotary electrical machine, in particular an alternator and/or an alternator-starter of a motor vehicle, comprising a support and one or a plurality of electronic components which can participate in the control of the said electrical machine, the support comprising a first part where the component(s) is/are mounted, the said first part having an edge, equipped with a brush-holder provided with at least one receptacle, known as the brush-holder receptacle, which can accommodate a brush which makes it possible to establish an electrical connection with a rotor of the electrical machine.

According to the invention, the said device is configured to permit the circulation of air through the said first part of the support, in contact with the said brush-holder. It is thus possible to ensure dissipation of heat at the level of this part of the regulator device, and to improve the functioning of the brushes. In addition, this also makes it possible to reduce the temperature at the level of the electronic circuit which the voltage regulator device comprises, because the heat transmitted by the electric tracks which connect the brush-holder to the said electronic circuit is reduced.

According to other characteristics which provide other advantages, taken in isolation or in combination:
- one or more slots, known as air circulation slots, is/are provided through the support between the said first part and the said brush-holder;
- one said air circulation slot is provided, extending along a surface of the brush-holder;
- the said air circulation slot(s) has/have a closed contour;
- the device additionally comprises a heat dissipater which is in a heat-exchange relationship with that the said component(s), the said support being designed to be mounted on the electrical machine such that the dissipater can orient a flow of air towards a low-pressure area provided between the said regulator device and the said machine;
- the dissipater comprises a base which is in a heat-exchange relationship with the said electronic component(s), and wings which extend from the said base, the said support being able to be mounted on the electrical machine such that the said wings can orient the flow of air towards the said low-pressure area;
- the said wings extend substantially perpendicularly relative to the said base, the said dissipater having an axis D, parallel to the wings, which is oriented towards the said low-pressure area;
- the brush-holder receptacle(s) is/are oriented according to a direction D', and the axis D of the dissipater and the axis D' of the brush-holder receptacle form an angle greater than 10°, for example contained between 40 and 90°, and in particular approximately 66°.

It is also possible for the dissipater to comprise two of the said wings which extend from lateral edges of the base, such as to have a profile in the form of a "U", which for example is obtained by bending. The dissipater then optionally comprises at least one additional fin for dissipation of heat, which for example is placed in a median manner, between the said two wings. The said wing(s) is/are added on for example by welding on the base.

The heat dissipater and the additional fin(s) is/are made of a heat-exchanging material.

By means of these additional fins, the dissipation of heat is improved further still. According to this embodiment of the invention, the following characteristics can be used:
- the said fin(s) extend(s) axially towards the interior beyond the base;
- the said fin(s) has/have an extension which can be placed opposite a central opening for intake of air of the said electrical machine;
- the said extension can be placed between the said support and the central opening in the electrical machine;
- the said fin(s) has/have a form globally in the form of an "L";
- the dissipater comprises a plurality of additional fins for dissipation of heat;
- the said additional fins) is/are made of the same material as the dissipater.

Again in an alternative or complementary manner, the said dissipater is made of copper, and is in direct or indirect contact with the component(s). Any additional fins will then also be made of copper. The dissipation of heat is thus further improved.

The invention also relates to a bearing of an electrical machine equipped with a regulator device as previously described, and a rotary electrical machine equipped with a bearing of this type.

According to one embodiment, the support of the regulator device covers at least one air opening in the bearing, and the slot(s) of the said device is/are implanted opposite one or more of the said air openings.

The bearing can additionally be equipped with a device for rectification of the current produced by the electrical machine, for formation of a current rectification fixture.

The latter can comprise a central opening, at the level of which the aforementioned low-pressure area is situated.

In particular, the said central opening is in the extension of a central opening in the bearing, the said central openings being designed to permit the passage of the shaft of the machine to which the voltage regulator device belongs.

It will be appreciated that the voltage regulator is not modified significantly. Thus, it is possible to use a conventional regulator, and to produce one or more slots through the support between the first part and the brush-holder. For example, in document US 2007/0035188, it is possible to produce one or more slots between the brush-holder and the heat dissipater. The solution does not require additional parts such as a brace. The solution is thus simple and economical.

The invention will be better understood in the light of the following description, which is provided only by way of indication, and does not have the purpose of limiting the invention, and is accompanied by the appended drawings.

DESCRIPTION OF EMBODIMENTS OF THE INVENTION

Figure 1:
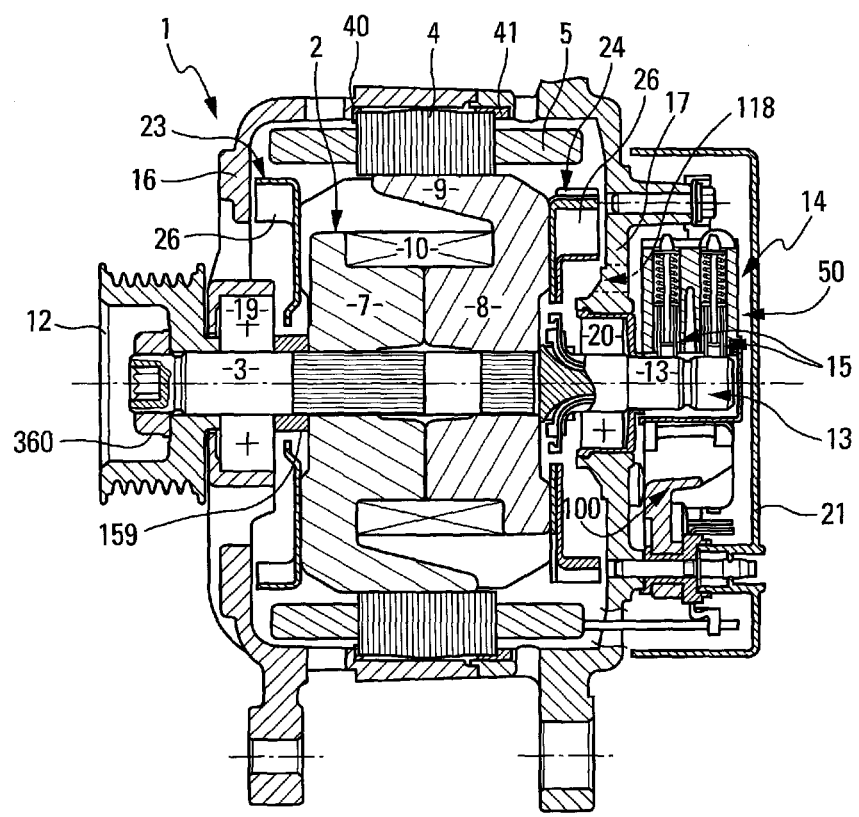
FIG. 1 illustrates an embodiment of an electrical machine according to the invention, according to a plane of radial cross-section.
Figure 2:
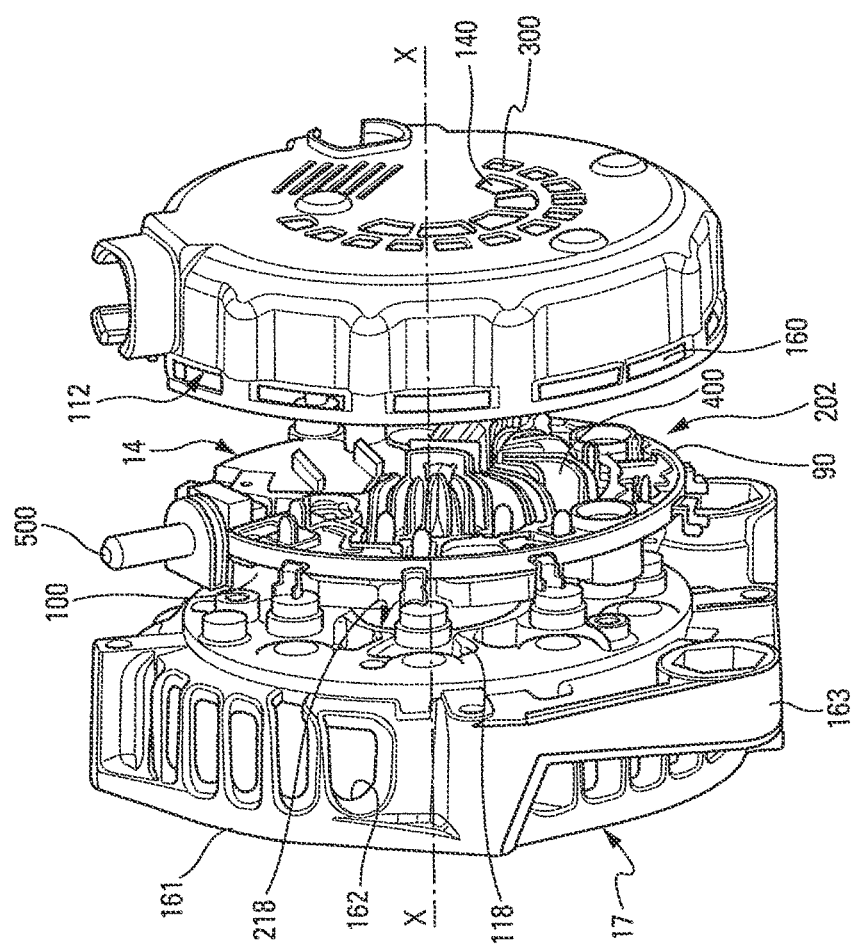
FIG. 2 is a view in perspective of an axial end part of a variant embodiment of the said machine, represented in an exploded manner.

Firstly, a description will be provided of an example of an electrical machine in which a regulator device according to the invention can be used, in relation with FIGS. 1 and 2.

As illustrated in FIG. 1, the said machine, which in particular is designed to be polyphase, comprises for example a casing 1, and, inside the latter, a shaft 3, a rotor 2 which is integral in rotation with the shaft 3, and a wound stator 4 which surrounds the rotor 2 with the presence of a slight gap, not shown in the figure.

This stator 4 comprises for example a body in the form of a set of plates provided with notches equipped with notch insulation, for the mounting of the stator winding 4.

The latter comprises a plurality of phases which can each comprise at least one coil which forms a chignon 5 on both sides of the stator body. The phase outputs are connected for example in the form of a triangle or a star, and are connected to a connector belonging to a device for rectification of an alternating current into a direct current, which is used to supply the on-board network and recharge the battery of the motor vehicle.

The rotor, which is designed to be inductive by means of at least one inductor winding 10 associated with the rotor, creates an alternating induced current in the stator winding 4 when the shaft 3 rotates. This current is rectified into direct current by means of the device for rectification of alternating current into direct current.

The rotor is in this case a rotor with claws, as described for example in documents US 2002/0175589 A1 and EP 0 454 039 A1, comprising two magnet wheels 7, 8 which are axially juxtaposed, and each have a transverse flange provided on their outer periphery with teeth 9 with a trapezoidal form, facing axially towards the flange of the other magnet wheel, the tooth of one magnet wheel penetrating in the space which exists between two adjacent teeth 9 of the other magnet wheel. An excitation winding 10 is implanted axially between the flanges of the wheels 7, 8. This winding 10 is supported by a cylindrical core in two parts, each belonging to one of the flanges of the wheels 7, 8. As a variant, the core is in a single piece, whilst being distinct from the flanges of the wheels 7, 8. The shaft 3 can have knurled portions for securing of the magnet wheels 7, 8.

When the excitation winding 10 is supplied electrically, the rotor 2, which is made of ferromagnetic material, is magnetised, and becomes an inductor rotor with formation of North/South magnetic poles at the level of the teeth for axial orientation of the magnet wheels 7, 8.

As a variant, the rotor can have projecting poles, as described for example in document WO 02/054566, and can then comprise a plurality of excitation windings, each round a pole of this type, and mounted in series as can be seen in FIGS. 1 and 2 of this document.

As a variant, the rotor comprises two magnet wheels with claws, and two excitation windings as described in document FR 2 857 517.

Again as a variant, the rotor is also provided with permanent magnets.

In the embodiment in FIG. 1, the shaft 3 of the rotor 2 supports at its front end a pulley 12 belonging to a device for transmission of movements between the alternator and the thermal engine of the motor vehicle. The said transmission device comprises at least one belt, not shown, which for example is driven by a crankshaft of the thermal engine.

In the example illustrated, the shaft 3 of the motor supports at its rear end collector rings 13 which are connected by wired connections to the terminals of the excitation winding(s) 10 of the rotor 2, of the type described in document FR 2 710 200, for example by means of a collector. Brushes 15 are arranged such as to rub on the collector rings 13. These brushes are accommodated in a brush-holder 50, which, in the example illustrated, belongs to the voltage regulator device 14 according to the invention, and will be described hereinafter. In practice, the collector ring which is closest to the rear end of the shaft 3 is connected to the earth.

The casing 1 is for example made in two parts, i.e. a front flange 16, known as the front bearing, adjacent to the pulley 12, and a rear flange 17, known as the rear bearing, which in this embodiment supports the voltage regulator device 14 and the device for rectification of alternating current into direct current.

The bearings 16, 17 are made of metal, and in this case aluminium. In this embodiment their form is hollow. As a variant, at least one of the bearings has a flat form. These bearings 16, 17 can each comprise centrally a ball bearing respectively 19 and 20 for the mounting in rotation of the shaft 3. In the embodiment in FIG. 1, a brace 159 is interposed between the inner ring of the bearing 19 and the magnet wheel 7, the pulley 12 being supported on the inner ring of the bearing 19, whilst being secured on the front end of the shaft 3 via a nut 360. These bearings 16, 17 are perforated, in order to permit the cooling of the alternator by circulation of air which is generated by the rotation of at least one fan. The bearings 16, 17 each have a central opening for the passage of the axial end concerned of the shaft 3.

According to one embodiment, not shown, this fan is external, and is adjacent to the pulley 12. In FIG. 1, the fan is internal, and is accommodated in the casing. For this purpose, the rotor 2 supports, at one of its axial ends at least, a fan which is designed to ensure this circulation of the air. In the example represented, a fan indicated as 23 is provided on the front frontal surface of the rotor, and another fan 24, which is more powerful, is provided on the rear surface, each fan being provided with a plurality of blades 26.

As a variant, in order to generate the flow of air which is used for cooling of the engine, use can be made of a turbine or centrifugal pump, as described in document FR 2 744 575.

Also as a variant, the bearing equipped with the voltage regulator device can be cooled by air whereas the other bearing is cooled by water.

In the case of the bearing equipped with fans, the bearings 16, 17 comprises a base with orientation which is globally transverse relative to the axis of the shaft 3 which constitutes the axis of rotation and axial symmetry of the machine. The bases are provided with a plurality of air intakes, and are each prolonged at their outer periphery by a skirt with orientation which is globally axial relative to the axis of the shaft 3. The skirt is provided with a plurality of air output openings. In other words, by means of the fans, circulation of air is generated between the air intake and output openings, with the flow of air penetrating in the alternator axially, and then being output radially, thus making it possible in particular to cool the chignons 5 of the stator winding 4. The air intake openings in the rear bearing have a globally trapezoidal form, for example.

A perforated protective cover 21 can also be provided, which covers the current rectification device and the voltage regulator device 14.

It will be noted (FIG. 1) that the body of the stator is mounted in the skirts of the bearings 16, 17 by means of a resilient seal 40 supported on a shoulder of the skirt of the bearing 16, and by means of resilient stoppers 41, which are mounted in the skirt of the bearing 17, which is shouldered for this purpose. As a variant, the body of the stator 14 is forced into the skirts of the bearings 16, 17.

According to the embodiments illustrated, one of the bearings, in this case the rear bearing, can support the device for rectification of current and/or the voltage regulator device 14, which can be seen partially in FIG. 1, for formation of an assembly which is known as the current rectification fixture. As a variant, it is the front bearing which supports the current rectification device and/or the voltage regulator device, as shown in FIG. 1 of document FR 2 744 575.

An arrangement of this type makes it possible to obtain an electrical machine and a device for rectification of current and/or a voltage regulator device forming a mechanical assembly which is ready to mount in the vehicle. In addition, it makes it possible to cool the device for rectification and/or the voltage regulator device by the flow of air generated by the said fan(s).

The said rectification device comprises a rectification bridge, which for example is three phase, hexaphase or pentaphase. As a variant, a plurality of current rectification bridges can be provided.

The bridge comprises for example a first heat dissipater, known as the negative dissipater, which supports first current rectification elements such as diodes or transistors of the MOSFET type, a second heat dissipater, known as the positive dissipater, which supports second current rectification elements such as diodes or transistors of the MOSFET type, and a connector comprising a body made of electrically insulating material in which electrically conductive branches are embedded. These branches are locally apparent, and each connect a first current rectification element of one of the dissipaters to a second current rectification element of the other dissipater, the said first and second rectification elements having different potentials. Each of the phase outputs of the alternator or the alternator-starter is connected electrically to a branch of the connector at a mid-point which is provided between the first and second rectification elements connected to the said branch.

According to one embodiment represented for example in document FR 2 754 650, the branches of the connector comprise lugs for connection to an output of each of the phases, and two of the branches are prolonged and provided at their free end with a half ring for connection to the voltage regulator device 14. In other words, as described hereinafter, according to one embodiment, the voltage regulator device according to the invention is connected to conductive branches which are connected to two of the phases of the motor. As a variant, as can be seen in FIG. 1 of this document FR 2 754 650, two of the branches are prolonged and provided at their free end with a ring for connection to the voltage regulator device 14.

The negative heat dissipater is constituted for example by one of the aluminium bearings 16, 17 of the casing 1 of the alternator which is connected to the earth of the motor vehicle, whereas the positive heat dissipater, which for example is made of aluminium, is electrically insulated by this bearing, and is provided with a terminal, known as terminal B+, which is designed to be connected to the positive terminal of the vehicle battery via a cable.

Figure 3:
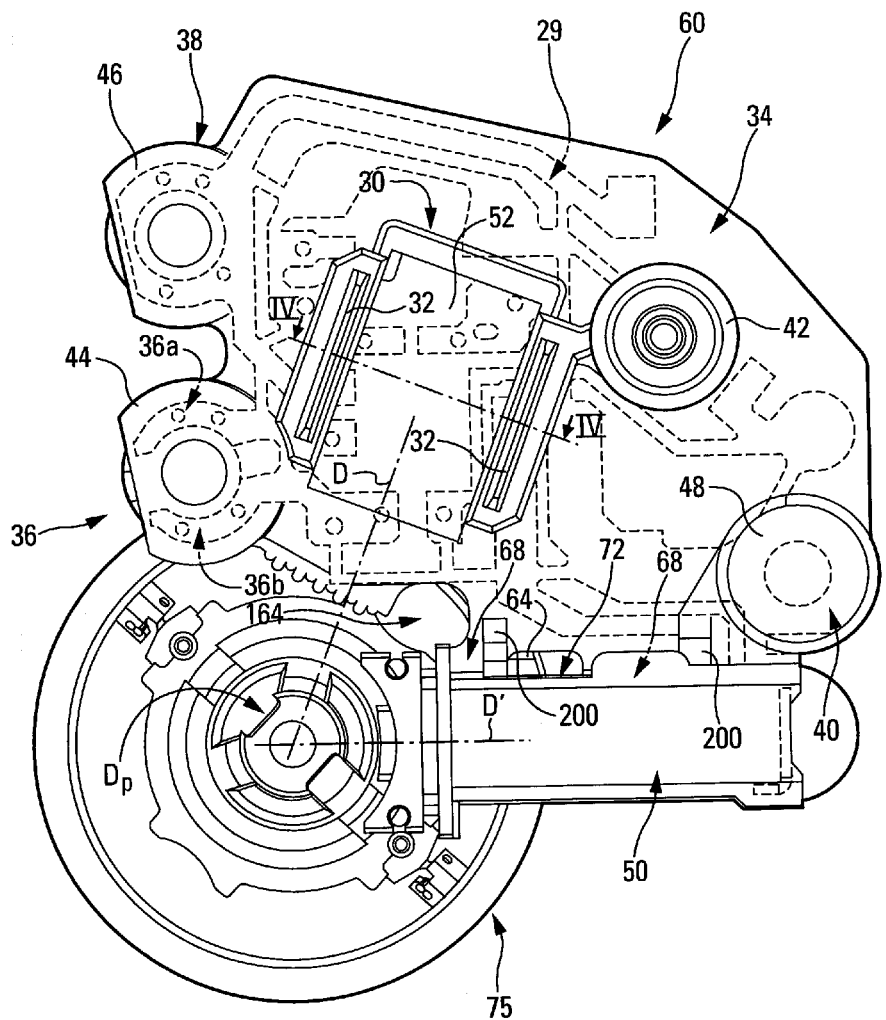
FIG. 3 is a plan view of an embodiment of a control device according to the invention.

The current rectification diodes are for example forced respectively into the negative dissipater and into the positive dissipater, as can be seen for example in FIG. 14 of document WO 02/054566, or in FIG. 3 of document WO 02/093717. The bridge in FIG. 1 is in this case of the type in FIG. 3 of document WO 02/093717.

According to this embodiment, as described in document FR 2 807 583, the positive heat dissipater can also comprise at one of its ends an extension in the form of a perforated ear for electrical contact with the voltage regulator device, and electrical connection with the positive terminal of the battery via the terminal B+ of this positive heat dissipater.

It will be appreciated that the number of current rectification elements depends on the applications, and in particular on the number of phases and current rectification bridges of the machine. Thus, three negative diodes and three positive diodes are provided in the embodiment in document WO 02/093717 relating to an alternator of the three phase type comprising a current rectification bridge. In document U.S. Pat. No. 7,019,424, six negative diodes and six positive diodes are provided, as well as two current rectification bridges, the alternator being of the double three-phase type.

FIG. 2, which is a view in perspective similar to FIG. 8 in document U.S. Pat. No. 7,019,424 shows this type of embodiment.

Thus, according to this embodiment of the invention, it is possible to use a protective cover 112, in this case made of plastic material, provided with openings 140, 300 and 160, for passage of air.

The current rectification device comprises a bridge 202 for rectification of alternating current into direct current, comprising a positive heat dissipater 100, which in particular is provided with fins 400 and/or a terminal 500 which constitutes the terminal B+, a connector 90 provided with lugs (with no reference), which for example project in the form of grippers for securing by crimping of the phase outputs of the stator winding, and a negative heat dissipater constituted by the rear bearing 17. This bearing comprises for example a base which is transverse relative to the axial axis of symmetry X-X combined with the axis of the shaft 3 in FIG. 1. This base is provided in its outer periphery with openings for mounting of the diodes. Its inner periphery has in particular a plurality of openings for intake of air, one of which can be seen at 118. These openings 118, which in this case have a globally trapezoidal form, are delimited laterally by arms which separate two consecutive openings 118, and/or are delimited on the interior by a central ring which delimits a central opening 218 for passage of the collector equipped with the collector rings 13 and of the axial rear end of the shaft of the rotor. The axis X-X passes via the centre of the opening 218. This base is prolonged on its outer periphery by a skirt 161 with orientation which is axial relative to the axis X-X provided with air output openings 162 with an oblong form. A securing lug 163 is also provided on a fixed part of the vehicle. The example of a voltage regulator 14 according to the invention illustrated in this figure is interposed between the circumferential ends of the positive dissipater 10, which is perforated for the mounting of the positive diodes.

The voltage regulator belongs to the current rectification fixture comprising the rear bearing 17 and the current rectification device.

A detailed description is now provided of the voltage regulator device 14 according to the invention.

Figure 4:
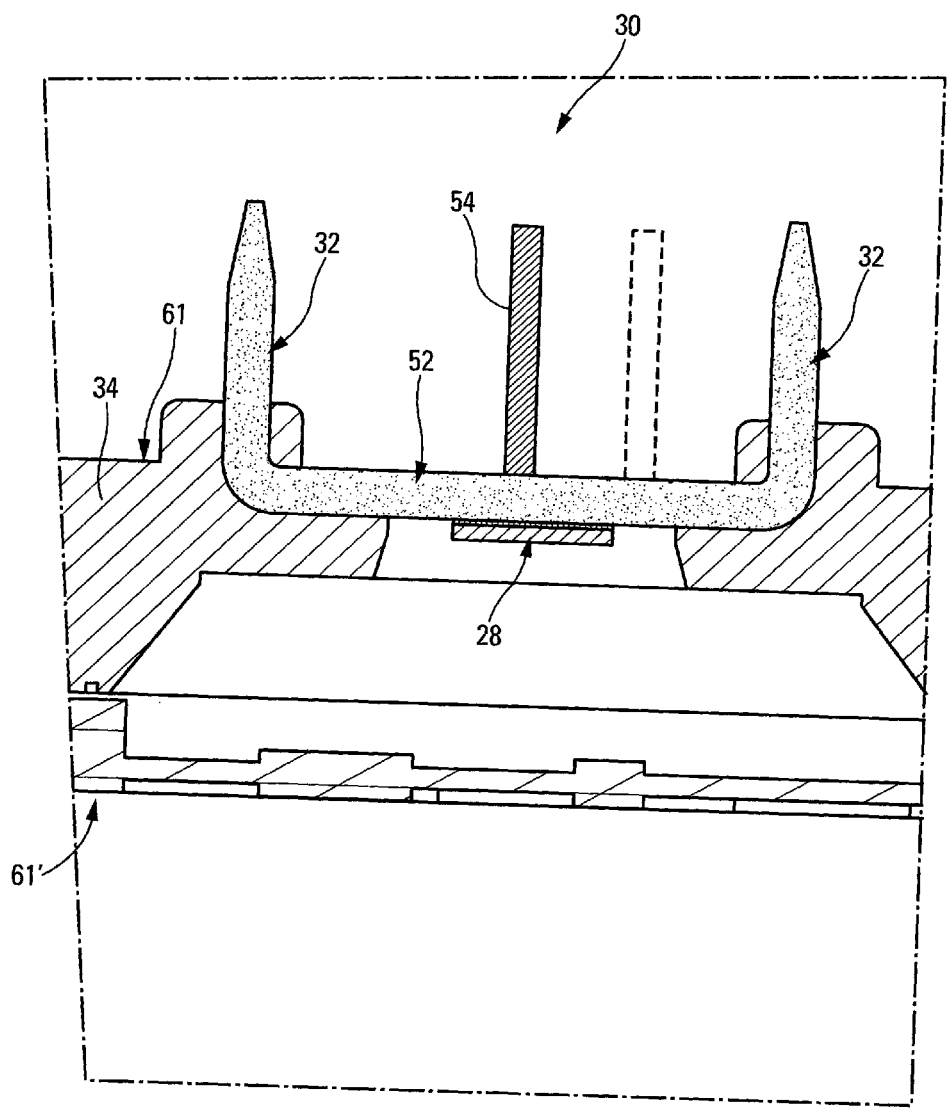
FIG. 4 is a view in cross-section produced according to the axis IV-IV illustrated in FIG. 3.
Figure 5:
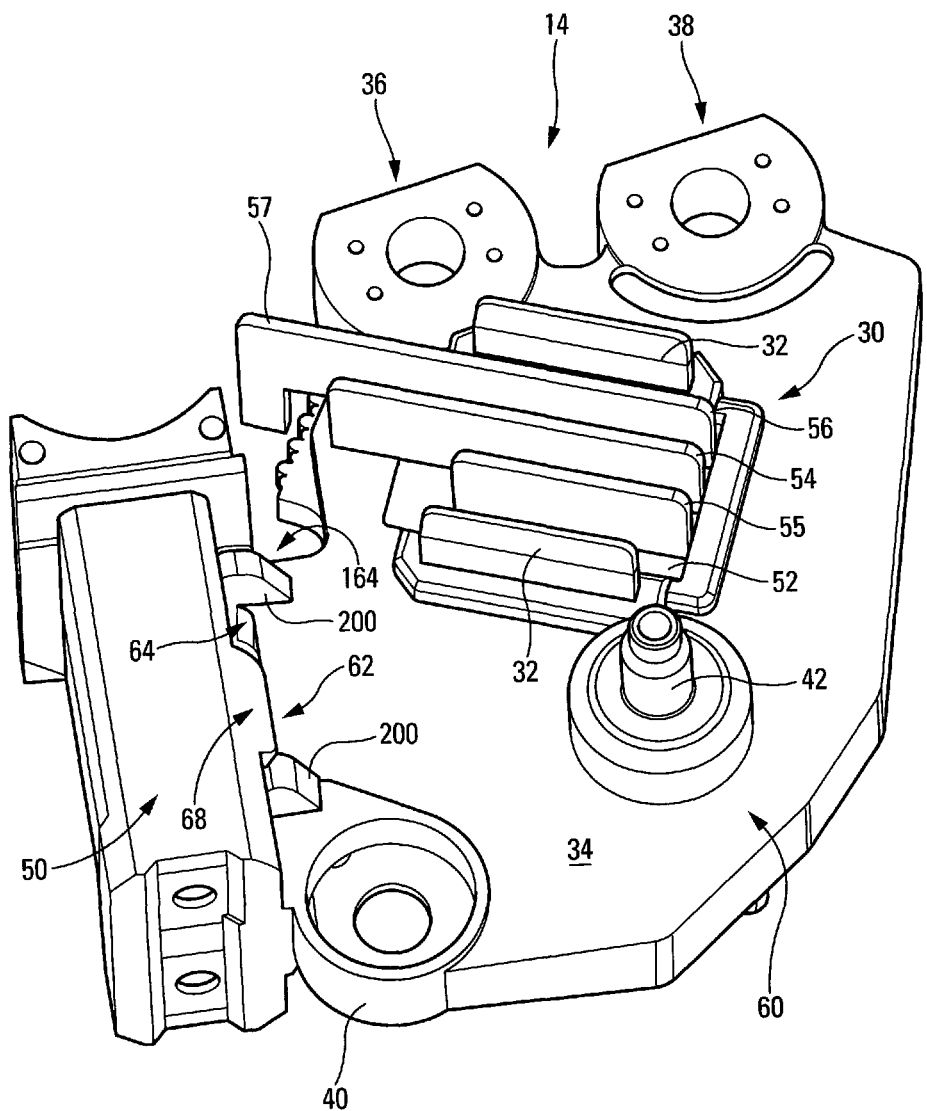
FIG. 5 is a view in perspective illustrating a variant embodiment of the control device according to the invention.

As illustrated in FIGS. 3 to 5, it comprises a support 34 and one or a plurality of electronic components 28, known hereinafter as the electronic control circuit, which can participate in the control of the said electrical machine. As previously stated, it also comprises a brush-holder 50. The said support 34 is made of insulating material such as, for example, PPS.

The electronic control circuit 28 is constituted for example by a circuit with a semiconductor or electronic chip, in particular of the ASIC type. It ensures regulation of the voltage supplied to the on-board network by the rotary electrical machine. For this purpose, it controls for example the current supplied to the excitation winding of the rotor, in particular according to various input data such as, inter alia, the voltage available at the terminals of the battery, the speed of rotation of the thermal engine and/or the temperature of the thermal engine.

In this embodiment, the electronic control circuits 28 can also receive information on two of the phases of the stator winding, such that the regulator works in good conditions by elimination of parasitic voltages, as indicated for example in document FR 2 649 797. It can also permit functioning of the machine in alternator-starter mode, as described in document FR 2 745 444, which, as is known, is a reversible alternator which also makes it possible to transform electric energy into mechanical energy, in particular in order to start the thermal engine.

The said electronic control circuit 28 is connected to different connection terminals of the regulator device 14 by means of electric tracks 29 which are embedded in the support 34, and are illustrated as a broken line in FIG. 3.

This involves for example a connection terminal 36 in two half-rings 36a, 36b which is designed to be connected to the corresponding terminal of the rectification device, which terminal is connected to two of the phases of the motor, as described in the aforementioned document FR 2 754 650. According to this embodiment, the support 34 of the regulator 14 can have projections and complimentary recesses (not shown) in order to insulate the half-rings and create a passage for a securing screw.

It also involves a connection terminal 38, which is designed to be connected electrically in the aforementioned manner to the terminal B+, and/or a connection terminal 40 which is designed to be secured on a duct of the bearing 17 (shown in FIG. 1) for electrical connection with the earth via this duct.

The regulator can also comprise a connector 42 which is connected by one or a plurality of the electric tracks 29 to the electronic control circuit 28, in particular in order to acquire information about the speed of rotation and the temperature of the thermal engine of the motor vehicle via wired connections which connect the connector 42 to an electronic control unit of the thermal engine of the vehicle. The said connector can be connected directly to an electric conductor on the exterior of the device. As a variant, it is connected to the cover, for this purpose comprising at least one electric track embedded in the body of the cover, which is made of electrically insulating material and is connected to a connector supported by the cover. In this case, as can be seen in FIGS. 3 and 5, the connector 42 consists of a terminal. It will be appreciated that, as a variant, two terminals are provided. All of this depends on the applications and the amount of information received by the device 14.

The regulator device according to the invention comprises for example three securing lugs 44, 46, 48 which are perforated centrally, for securing of the regulator on the bearing by means of screws. The said terminals 36 for connection to two of the phases of the motor, 38 at the terminal B+, and 40 at the earth, are, for example, provided respectively at the level of the said ears 44, 46, 48. As a variant, in the aforementioned manner, two ears are provided for each of the connections to one of the phases instead of a single ear 44. These ears can retain a standard location relative to one another from one generation of the regulator device to another, so that they can be secured on the same support.

The ear 48 which is designed to be secured on the bearing 17 is the one closest to the brush-holder 50, whereas the other two ears 44, 46 are in the vicinity of one another, and/or adjacent to the electronic control circuit 28, the ear 44 corresponding to the terminal 36 for connection to two of the phases of the electrical machine being closer to the brush-holder 50 than the ear 46 corresponding to the terminal for connection to the terminal B+.

The said control circuit 28 is situated for example between the connector 42 and the two ears 44, 46, in the vicinity of one another, as for the dissipater 30.

It is apparent from the foregoing description that the regulator device 14 according to the invention is designed to be fitted in place of, and instead of, that in FIG. 8 of the aforementioned document U.S. Pat. No. 7,019,424, advantageously without modifications of the electrical connections of the device 14 to the positive dissipater 100, to the two phase outputs of the connector, and to the two phases of the connector 90. The support comprises a first part 60, where the electronic circuit 28 is mounted. The said first part 60 has for example two opposite surfaces 61, 61', which in particular are parallel, such that the said first part 60 of the support 34 is substantially flat. The said first part 60 has an edge 62 which is equipped with the said brush-holder 50. The latter is provided with at least one receptacle, known as the brush-holder receptacle, which can accommodate a brush, the brush(es) making it possible to establish an electrical connection with the rotor of the electrical machine.

In this case, two receptacles are provided, situated one above the other, as can be seen in FIG. 5, and having the same orientation D', for a first brush which is designed to be connected to a source which supplies the excitation current of the rotor, as determined by the electronic control circuit 28, and for a second brush which is designed to be connected to the earth, as can be seen in FIG. 1.

The said support 34 is configured for example such as to be able to be secured whilst permitting orientation of the brush-holder receptacle(s) 50 in the direction of the axis of the rotor.

The positive dissipater 100 and the support 34 of the regulator 14 which prolong the said positive dissipater 100 circumferentially define a central opening, which is known as the air aspiration opening, not shown in the figures, and is situated in the axial extension of the central opening 218 in the bearing 17. The said brush-holder is oriented in particular in the direction of the said air aspiration opening.

The said brush-holder 50 has for example a globally parallelepiped form. The receptacles have in particular a globally rectangular cross-section for mounting of the brushes in each of them. The brushes can be thrust radially by a spring in the direction of the collector ring 3 concerned. Each brush is connected, for example by means of an electrically conductive braid, to an electric terminal, which itself is connected electrically to one of the electric tracks 29 embedded in the support 34. These tracks are connected electrically to the electronic control circuit 28 of the regulator 14.

According to the invention, the regulator device is configured in order to permit circulation of air through the said first part 60 of the support 34, in contact with the said brush-holder(s). In particular, it is configured to permit circulation of air from one surface 61 to the other surface 61' of the said first part 60 at the level of the edge 62.

For this purpose it is possible to provide one or more slots 64, known as air circulation slots, through the support 34, between the said first part 60 and the brush-holder 50.

The support 34 can be configured to cover at least one air opening 118 of the bearing 17. In this embodiment, it can also be configured such that the slot(s) 64 is/are implanted opposite one of the air openings 118. The said slot(s) 64 for circulation of air extend(s) along a surface 72 of the brush-holder.

The said slot(s) 64 for circulation of air is/are provided with a closed contour.

An undercut 164 is provided at the level of the inner end of the brush-holder. This undercut, which is open towards the interior, affects the lateral edge of the device 14 which extends between the ear 44 and the inner periphery of the brush-holder 50. This therefore increases the passage of air and the cooling of the brush-holder and the brushes. Optionally, the undercut 164 bears identification marking.

The bridges of material 68 which remain between the first part 60 and the brush-holder make it possible to ensure the mechanical connection between these two areas of the regulator device 14 and the passage of the electric tracks 29. In this respect, reinforcement ribs 200 can be provided between the first part 60 of the support 34 and the brush-holder 50. In this case there are two of the ribs. They are provided for example on both sides of the slot 64.

The regulator device also comprises for example a heat dissipater 30, with parallel wings 32 for dissipation of heat, which is positioned on the support 34.

The dissipater is in a heat-exchange relationship with the electronic control circuit 28, in order to ensure its cooling, in particular by means of the flow of air which passes through the rear bearing. The dissipater 28 is in particular above the control circuit 28. The dissipater 30 is in particular over moulded in the support 34.

The said support 34 can be designed to be mounted on the electrical machine such that the wings 32 of the dissipater 30 can orient a flow of air towards a low-pressure area Dp provided between the said support and the said machine. This therefore improves the dissipation of heat.

The said low-pressure area is situated in particular at the level of the said air aspiration opening.

In particular, the said wings 32 are oriented such as to direct the flow of air radially, i.e. towards the axis of the rotor of the electrical machine and towards the central air aspiration opening. This flow of air is then directed axially towards the opening 218. It can be noted that FIG. 3 shows a collector 75 of the type described in document FR 2 710 200. This collector 75 is mounted on the rear end of the shaft 3 and passes through the central opening 218 in the bearing 17, in which there is mounted in a known manner a ring (with no reference in FIG. 1) interposed radially between the edge of the opening 218 and the outer periphery of the outer ring of the bearing 20. This ring comprises a base (with no reference in FIG. 1) through which the collector passes. This base is perforated, and comprises for this purpose a plurality of circumferential openings with an oblong form. The ring makes it possible to absorb the phenomena of expansion which occur between the bearing 17 and the bearing 20.

The dissipater 30 comprises for example a base 52, which is in a heat-exchange relationship with the electronic control circuit 28. The said wings 32 thus extend from the said base 52. The said control circuit 28 is in particular centred on the said base. The ratio of the surface area of the said circuit 28 to that of the said base 52 is for example contained between 30 and 60%.

The said wings 32 can extend substantially perpendicularly relative to the said base 52. The said dissipater 30 has an axis D, parallel to the wings 32, which is oriented towards the said low-pressure area. In other words, the axis D is for example oriented radially relative to the axis of the rotor.

The axis D of the dissipater 30 and the axis D' of the brush-holder receptacle form for example an angle greater than 10°, such as an angle contained between 40 and 90°, and in particular an angle of approximately 66°, which gives good results.

According to the embodiment illustrated in FIG. 3, the dissipater comprises for example two of the said dissipation wings 32 which extend from the lateral edges of the base 52, such as to have a profile in the form of a "U".

According to a variant embodiment illustrated in FIGS. 4 and 5, the dissipater 30 comprises at least one additional fin 54, 55, 56 for dissipation of heat, placed between the said two dissipation wings 32.

The said additional fin 54 is for example situated in a median position, i.e. just above the circuit 28, in order to cool better the electronic component(s) of the electronic circuit. In other words, the dissipater has a profile in the form of an "E", as can be seen in FIG. 4.

At least one other fin for dissipation of heat can be provided. In FIG. 4, a fin of this type is represented in a broken line. In FIG. 5, two other additional fins are provided, for example halfway between the first fin 54 and the dissipation wings 32 which extend from the lateral edges of the base 52 of the dissipater 30.

The said median fin 54 can be prolonged axially on the axis D beyond the base 52 of the dissipater 30, in the direction of the air aspiration opening, in order to discharge the heat better. According to one variant, this median fin is also prolonged axially on the axis D towards the interior, in order to extend beyond the support 34, and to be placed opposite the air aspiration opening. Another one 56 of the fins could have an extension 57 which faces axially towards the interior parallel to the axis D, such that this extension is designed to be placed opposite the air aspiration opening. According to one embodiment, the extension has an inner end perpendicular to the support 34, as can be seen in FIG. 5. This extension faces the air aspiration opening. In other words, the said fin 56 has a profile in the form of an "L". The said fins 54, 55, 56 thus have an increasing length.

It will be appreciated that all of this depends on the applications, with the median fin 54 having in one variant the form of an "L" identical to that of the fin 56. All the combinations of form and number of fins are possible.

According to one embodiment, the said dissipater 30 is made of metal, for example it is made of copper. In other words, the components of the dissipater, the base 52 and/or the dissipation wings 32, 54 are made of copper. This can be a quality of copper with a coefficient of conductivity situated between 350 and 400 W/m·K, and/or a coefficient of thermal expansion situated between 15 and 20.

The base 52 of the dissipater and the dissipation wings 32 which are derived from it can be obtained by bending.

The dissipater 30, and in particular its base 52, is in contact with the electronic control circuit 28, for example by means of silver adhesive. According to one variant, the base is in indirect contact with the electronic component(s) by means of a substrate interposed between the base and the said electronic component(s).

The additional dissipation fins) 54 can be added onto the base 52 of the dissipater, for example by laser welding. It or they has/have in particular a thickness which is smaller than that of the expansion wings 32 derived from the base 52.

As a variant, they can be added onto the base 52 by being inserted in a slot or grooves provided in the base 52. In this case, the fin(s) is/are made of heat-exchanging material, like the dissipater. They are made of a material identical to that of the dissipater 30, or, as a variant, they are made of a different material, the dissipater being for example made of copper and the fins made of aluminium, or any other material which makes it possible to adjust the transfer of heat. As a variant, one of the fins is made of copper, and the other fins) is/are made of a different material, for example aluminium. The grooves can be delimited by a pair of ribs. They make it possible to use a standard dissipater, to which there is added a greater or lesser number of fins, according to the needs.

In FIG. 2, only the dissipation wings 32 and the brush-holder 50 of the voltage regulator device 14 are represented in detail, the other details, in particular the connection terminals, having been omitted for the sake of simplification.

According to one approach, the said regulator device 14 comprises two parts, i.e. an electronic part with the electronic control circuit 28 and the electrical tracks 29, and a mechatronic part with the support 34, including the brush-holder cages provided, as well as the dissipater 30.

As is apparent from the foregoing description and the drawings, the extensions of the fins 54, 56 face towards a central opening of the machine, constituted by the central air aspiration opening. These extensions are designed to be placed at least between the support 34 and the said central opening, with the extension 57 penetrating in this central opening.

The support 34 covers at least partially an air intake opening 118, whereas, in this embodiment, the fins of the positive heat dissipater 100 permit axial passage of a flow of air through the said openings, as represented in FIGS. 1 and 5 of the aforementioned document U.S. Pat. No. 7,019,424. The passage through these openings 118 depends on the applications and the form of the current rectification bridges.

The central air aspiration opening constitutes a low-pressure area provided between the support 34 and the rotary electrical machine.

It will be appreciated that the alternator is more robust, since the electronic circuit of the voltage regulator device is more sensitive to the increase in temperature than the current rectification bridge(s), which can function at limit temperatures, determined by the technology, for example of approximately 225°. By means of the invention, there is a decrease in the temperature of the electronic circuit of the voltage regulator device, which must not function at temperatures at the limits of the technology of the electronic circuit, for example at 150° in the case of an electronic circuit in the form of a semiconductor. The orientation of the heat dissipater, which can be provided with at least one additional fin, also makes it possible to decrease the temperature of the electronic circuit. According to a downgraded embodiment, the orientation of the heat dissipater is different from the above-described orientation.

The invention claimed is:

1. A bearing of a rotary electrical machine equipped with a voltage regulator device supported by said bearing, said rotary electrical machine being an alternator or an alternator-starter of a motor vehicle, said voltage regulator device comprising:
- a support (34); and
- at least one electronic component (28) configured to participate in the control of said electrical machine, said support (34) comprising a first part (60) where said at least one electronic component is mounted, said first part having an edge (62) equipped with a brush-holder (50) provided with at least one brush-holder receptacle configured to accommodate a brush (15) provided to establish an electrical connection with a rotor (3) of the electrical machine;
- said voltage regulator device configured to permit the circulation of air through said first part (60) of said support (34), in contact with said brush-holder (50), from one surface (61) to an opposite surface (61') of said first part (60) of said support (34);
- wherein at least one air circulation slot (64) is provided through the support (34) between said first part and said brush-holder, wherein said support (34) covers at least one air opening (118) in said bearing (17), and wherein said at least one air circulation slot (64) is provided opposite said at least one air opening (118).

2. The bearing according to claim 1, comprising one said air circulation slot which extends along a surface (72) of said brush-holder.

3. The bearing according to claim 1, wherein said at least one air circulation slot (64) has a closed contour.

4. The bearing according to claim 1, additionally comprising a heat dissipater (30) which is in a heat-exchange relationship with said at least one electronic component (28), said support being designed to be mounted on the electrical machine such that said heat dissipater (30) directs a flow of air towards a low-pressure area provided between said regulator device and said machine.

5. The bearing according to claim 4, wherein the dissipater comprises a base (52) which is in a heat-exchange relationship with said at least one electronic component (28), and wings (32) which extend from said base, and wherein said support is mounted on said electrical machine such that said wings direct the flow of air towards said low-pressure area.

6. The bearing according to claim 5, wherein said wings (32) extend substantially perpendicularly relative to said base (52), and wherein said dissipater has an axis D, parallel to the wings, which is oriented towards said low-pressure area.

7. The bearing according to claim 6, wherein said at least one brush-holder receptacle has an axis D', and wherein the axis D of the dissipater and the axis D' of the brush-holder receptacle form an angle greater than 10°.

8. The bearing according to claim 5, wherein the dissipater comprises two of said wings which extend from lateral edges of the base, such as to have a profile in the form of a "U", and at least one additional fin (54, 55, 56) for dissipation, wherein said at least one additional fin (54, 55, 56) is placed between said two wings (32).

9. The bearing according to claim 8, wherein said at least one additional fin (54, 55, 56) extends axially towards the interior, beyond the base.

10. The bearing according to claim 9, wherein said at least one additional fin (54, 55, 56) has an extension configured to be placed between said support and a central air intake opening in said electrical machine.

11. The bearing according to claim 4, wherein said dissipater is made of copper and is in contact with said at least one electronic component (28).

12. The bearing according to claim 11, wherein reinforcement ribs (200) are provided between said first part (60) of said support (34) and said brush-holder (50).

13. A rotary electrical machine being an alternator or an alternator-starter of a motor vehicle, said rotary electrical machine having a rotational axis and comprising:
- a bearing; and
- a voltage regulator device supported by said bearing, said voltage regulator device comprising:
  - a support (34); and
  - at least one electronic component (28) configured to participate in the control of said electrical machine, said support (34) comprising a first part (60) where said at least one electronic component is mounted, said first part having an edge (62) equipped with a brush-holder (50) provided with at least one brush-holder receptacle configured to accommodate a brush (15) provided to establish an electrical connection with a rotor (3) of the electrical machine;
  - said voltage regulator device configured to permit the circulation of air through said first part (60) of said support (34), in contact with said brush-holder (50), from one surface (61) to an opposite surface (61') of said first part (60) of said support (34),
  - wherein at least one air circulation slot (64) is provided through the support (34) between said first part and said brush-holder, wherein said support (34) covers at least one air opening (118) in said bearing (17), and wherein said at least one air circulation slot (64) is provided opposite said at least one air opening (118).

\* \* \* \* \*